US00RE37647E

(19) United States
(12) Reissued Patent
Wolf

(10) Patent Number: US RE37,647 E
(45) Date of Reissued Patent: Apr. 9, 2002

(54) GOLF CLUB PUTTER

(75) Inventor: Richmond A. Wolf, Pasadena, CA (US)

(73) Assignee: California Institute of Technology, Pasadena, CA (US)

(21) Appl. No.: 09/263,802

(22) Filed: Mar. 4, 1999

Related U.S. Patent Documents

Reissue of:
(64) Patent No.: 5,607,365
Issued: Mar. 4, 1997
Appl. No.: 08/615,493
Filed: Mar. 12, 1996

(51) Int. Cl.[7] ..... A63B 53/04
(52) U.S. Cl. ..... 473/328; 473/340; 473/341
(58) Field of Search ..... 473/328, 329, 473/340, 324, 342, 251, 242, 226, 238, 257

(56) References Cited

U.S. PATENT DOCUMENTS 3,680,868 A * 8/1972 Jacob ..... 473/328
3,893,672 A * 7/1975 Schonher ..... 473/328
4,071,513 A * 1/1978 Swanson ..... 473/328
4,498,673 A * 2/1985 Swanson ..... 473/328
4,679,792 A * 7/1987 Straza ..... 473/329
5,213,329 A * 5/1993 Okumoto ..... 473/328
5,286,027 A * 2/1994 Koumarianos ..... 473/328
5,332,214 A * 7/1994 Tucker ..... 473/329
5,368,659 A * 11/1994 Peker et al.
5,467,987 A * 11/1995 Perkins ..... 473/340

OTHER PUBLICATIONS

Progear Advertisement; Great Inventors Come in Stages, Then There's a leap:; Mar. 1996; Golf Tips Magazine.*

* cited by examiner

*Primary Examiner*—Sebastiano Passaniti
(74) *Attorney, Agent, or Firm*—Fish & Richardson P.C.

(57) ABSTRACT

An improved putter including a pair of runners attached to the bottom of the putter head. The runners take up less than the entire surface of the bottom of the golf club. They raise the blade of the putter above a ground surface. Their surface area is less than that of the bottom of the golf club, so the interaction with the ground is significantly reduced. This minimizes the interaction between the putter's blade and the ground during putting. The chances that the putter squarely strikes the ball without catching on the ground is increased. The runners also raise the blade to a level to at or near the golf ball's equator. This improves the probability of the blade striking the ball with an upward blow during a swing. The upward blow imparts a desirable top-spin roll on the ball. Undesirable spins which make the ball deviate from its intended path, such as back spin or side spin, are eliminated.

12 Claims, 7 Drawing Sheets

GOLF CLUB PUTTER

Matter enclosed in heavy brackets [ ] appears in the original patent but forms no part of this reissue specification; matter printed in italics indicates the additions made by reissue.

FIELD OF THE INVENTION

The present invention relates to improved putters which have surfaces that improve accuracy in golf ball interaction.

BACKGROUND AND SUMMARY

An important part of golfing is putting. Accurate putting requires attention to speed/distance and line. Speed/distance defines the velocity and force applied to a ball, while line defines the direction of the moving ball. The line can only be made by the golfer, but the speed can be aided by a more consistent roll.

A top spin roll is generally most desired because it is less likely to be affected by bumps on the green which might otherwise effect the line of the ball. Many golf putter designs have attempted to aid the golfer in producing a moving ball that has an appropriate top spin roll.

It is an object of the invention to define a new design that facilitates this result.

Another problem with accuracy in putting is caused by ground interaction. A golfer usually lines up the putter with the ball ("at address"), brings the club back ("takeaway"), and then hits the ball and follows through. The desired results are obtained when the putter is kept exactly as the golfer intended it. However, the putter is usually touching the ground at address. During takeaway, the putter may interact with the ground ("ground interaction"). The golfer aims to keep the putter slightly above the ground during the rest of the takeaway and follow through. However, sometimes the putter does touch the ground. Even the most carefully manicured course includes some irregularities in its greens. This can effect the aiming of the putter, and hence effect the line of the ball.

In recognition of this problem, it is an object of another aspect of the present invention to reduce the amount of interaction between the club and the green. This is preferably done by reducing the surface area of the surface of the club that interacts with the ground, using a new technique.

It is often desirable to strike the golf ball near the center of gravity of the ball, i.e., its equator. The equator of a golf ball is usually around 0.75 inches off the ground, since a golf ball has a diameter of 1.5 inches. Another goal of the present invention is to aid the golfer in striking the ball at a consistent location.

The present invention features an improved golf putter which includes a pair of ground engaging surfaces attached to downwardly extending areas called herein runners. The runners include downwardly-extending feet which extend from the bottom surface of the putter head at the head's heel and toe. Each runner has a surface area which is less than the entire area of the bottom surface of the putter. The runner also has a height which depends on the shape and mass of the putter. The height preferably ranges from ⅜–⅝ inches.

During a stroke, this ground engaging surface becomes the lowermost area of the putter. If this surface does come into contact with the ground, the leading edge of the putter blade ("the blade") is raised to a level which is slightly below the ball's equator. Since any putter generally does not touch the ground during a putt, the ball will be struck with an upward blow during a putting stroke. This action facilitates imparting the desirable top-spin roll to the golf ball.

The runners also facilitate the blade striking the ball at a location that minimizes undesirable side spin or back spin which otherwise occurs when the ball is putt.

The present invention defines improved structural aspects and surfaces which reduce the surface area that usually would come into contact with the ground. This thereby reduces the chance of ground interaction.

The base of the runners of the present invention have a reduced ground engaging surface area, thereby reducing their interaction with the ground. The runners have a smaller surface area than the head itself to minimize interaction with the ground. The combined surface area of each runner is preferably in the range of 0.15–0.35 $in^2$. The edge of the runners are preferably formed with a shape to further minimize interaction with the ground during a putting stroke, rounded, angled, or tapered.

The positions of the runners also allow the user to place or "set" the putter relative to the ball in a consistent, well defined way. During the takeaway, the head is brought back and then moved forward along a straight path which is collinear with the desired path of the ball. This facilitates consistent, accurate putting.

As described above, a good putt involves proper speed and direction, including consistent speed and a desired direction from a straight takeaway and straight follow through. The present invention modifies speed by raising the blade, and modifies line by reducing the surface area.

Another aspect of the present invention uses an insert at the blade surface that is formed of a different material than the material of the remainder of the golf club. That material may, for example, have an elasticity which is similar to that of the covering of the golf ball (e.g., rubber or plastic). The insert makes it possible to strike the golf ball with a consistent force. The insert also produces a desirable "dead hit" which further facilitates accurate putting.

BRIEF DESCRIPTION OF THE DRAWINGS

These and other aspects of the present invention will now be described in detail with reference to the accompanying drawings, in which.

DETAILED DESCRIPTION

Figure 1A:
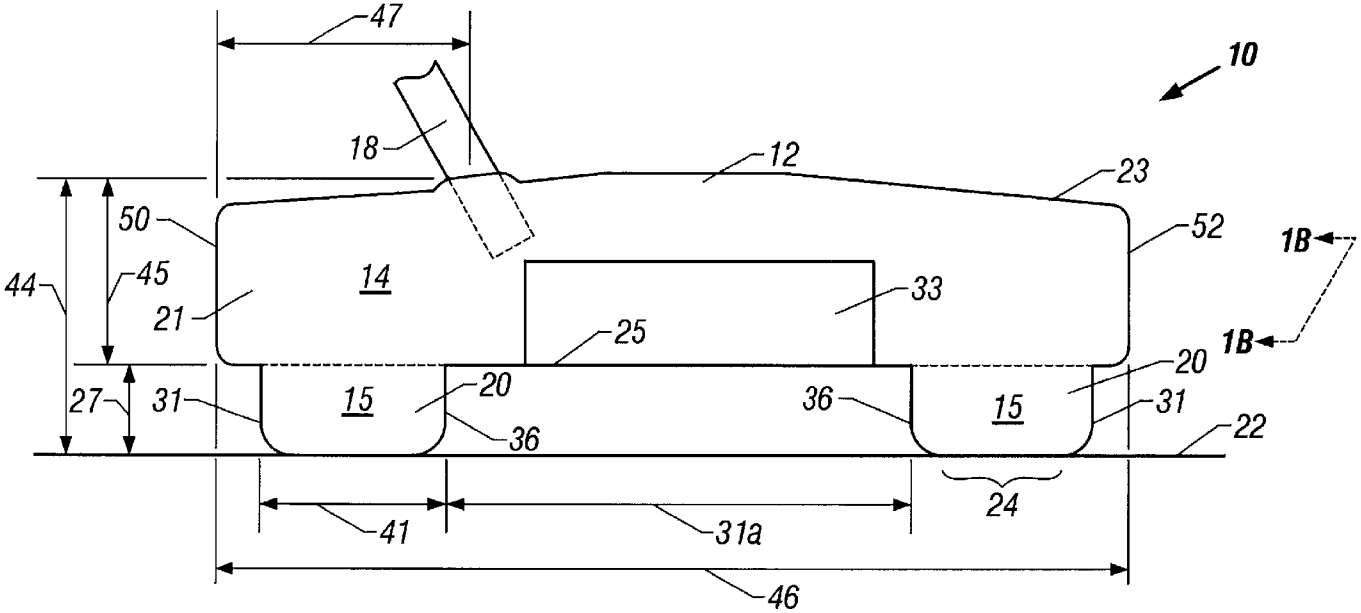
FIG. 1A is a front view of an improved putter according to the invention.
Figure 1B:
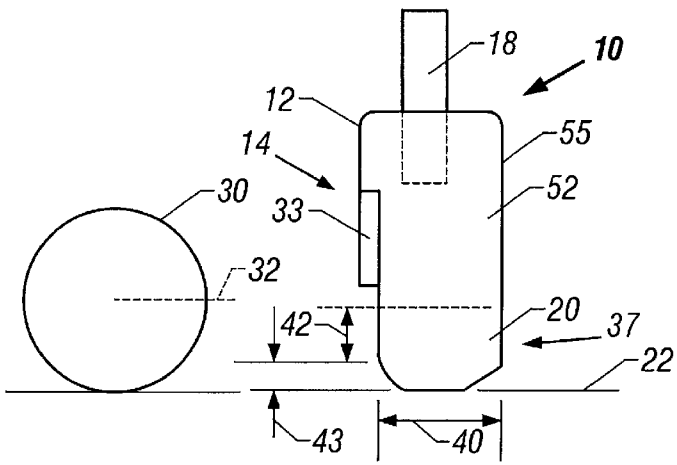
FIG. 1B is a side view of the putter of FIG. 1A prior to contact with a golf ball.

FIGS. 1A and 1B respectively show front and side views of a first embodiment of a putter 10 according to the invention. The putter 10 includes a head 12 having a front face 14, a shaft 18 which can include a handle or other elements allowing gripping the golf club, and a pair of runners 20, 21. Each runner includes a front portion 15 which faces the ball 30, and inside 36, outside 31, and back 37 portions. A ground engaging surface is formed from the lowermost surfaces of the runners in the general area 24.

The putter has a heel end 21 and a toe end 23. The first runner 20 is formed on the bottom surface of the head at the toe end 23 and the heel end 21. Blade 25 is formed on front face 14 between the runners 20 and 21.

The head 12 also includes side surfaces 50, 52 and rear surface 55, and a bottom surface 57.

The runners 20 and 21 raise the blade 25 of the putter 20 above a ground surface 22.

The surface area of the ground engaging surfaces of the runners (indicated by the bracket 24) which contacts the ground 22 is smaller than the surface area of the bottom surface 57 of the putter head 12. This system minimizes interactions between the blade and the ground during putting. The minimized interactions can reduce deflections of the putter. They also promote a firm top spin roll of the ball. The runners 20 and 21 also raise the blade 25 to a level which is slightly below the equator 32 of the ball 30 which allows more consistent putting pace which can contribute to speed. This helps the blade 25 to strike the ball 30 with an upward blow during putting. The upward blow imparts a desirable top-spin roll on the ball, and causes undesirable spin which tend to cause the ball to deviate from the desired path, such as back or side spins to be minimized.

The height and surface area of the runners are important design parameters in the putter head design. The height of the runner is shown as the arrow 27. This height determines the location where the ball is struck. A golfer usually raises the putter off the ground slightly during a putt. A putt begins with the bottom of the club head on the ground, but the putter is raised above the ground at the moment when it strikes the ball. The inventor found it desirable to form the runners to have a height which is below the equator of the ball.

The runners 20, 21 preferably have a height between ⅜ inches and ⅝ inches, with a height of 0.55 inches being the most preferred.

The total surface area of the runners is chosen to provide a stable base on which to set the putter while minimizing contact between the head and the ground. The preferred surface area is between 0.15–0.35 square inches per runner for a total of 0.3–0.7 square inches.

The distance separating the runners (shown by the arrow 31) is preferably wider than a golf ball diameter (1.5 inches). Preferably, the distance is between 1.5 and 2.5 inches. Other preferred dimensions of the putter are described herein with reference to the further embodiments.

Each runner preferably includes a straight segment (arrow 42) and a curved, tapered, or angled segment (arrow 43) along the front vertical portion which faces the ball. Sharp edges are less preferred, as they tend to catch on the ground during putting, thereby disrupting the swing. The back portion 37 of the runner is similar to the front portion, and includes a straight segment and a curved, tapered, or angled segment.

Insert 33 is shown on the front face 12. Insert 33 may be disposed between the two runners. As will become evident from investigation of the other embodiments, the insert is optional, and many usable embodiments omit using the insert.

The insert 33 includes a lower edge which is located even with the blade 25. The insert 33 is preferably formed of a material different than the material of the putter head 12.

Most preferably, the insert is formed of a material having some property which is similar to the material forming the outer covering of the golf ball. The insert 33 promotes a desirable "dead hit" when the ball is struck. Such a hit reduces vibrations during impact, minimizes the chances that the ball "jumps" off the front face of the putter head following impact, and, in general, provides the user with a more comfortable feel during putting.

The present invention preferably uses two runners. The putter is rested on the two runners prior to putting. During putting, the putter is easily drawn backwards from the rested position, and then pushed forward in a pendulum-type motion. The path along which the putter swings is generally collinear with the desired path of the ball. Conventional putters, in contrast, have a much larger bottom surface area. This creates a greater possibility that during takeaway or follow through that there may be risk of interaction with the ground. The present design is less likely to be thrown off line because there is less surface area interaction with the ground. Since the putter starts at rest on the ground and most be moved, interactions between the uneven ground and the putter surface must take place.

The inventor currently contemplates forming the putter of the present invention from the metallic glasses, as described in U.S. Pat. Nos. 5,288,344 and 5,368,659, the disclosures of which are herewith incorporated by reference to the extent necessary for understanding of the present invention.

Figure 2A:
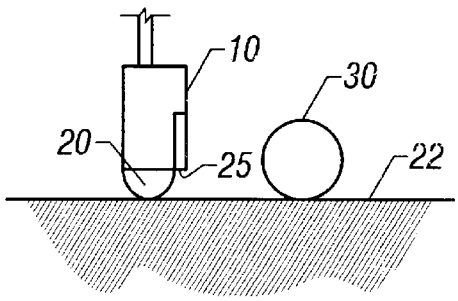
FIGS. 2A–2D are side views of the putter of FIG. 1A, respectively, prior to being swung, during swinging, immediately prior to contact with a golf ball, and immediately after contact with the golf ball.
Figure 2B:
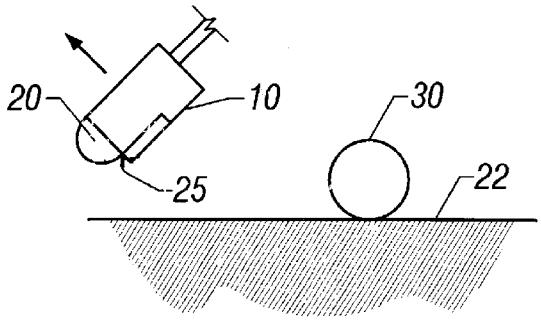
Figure 2C:
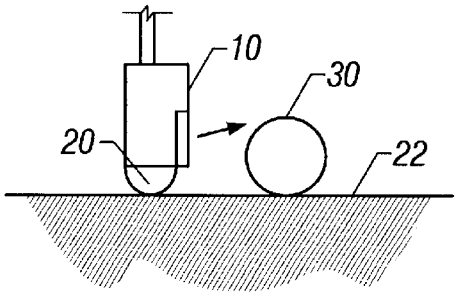
Figure 2D:
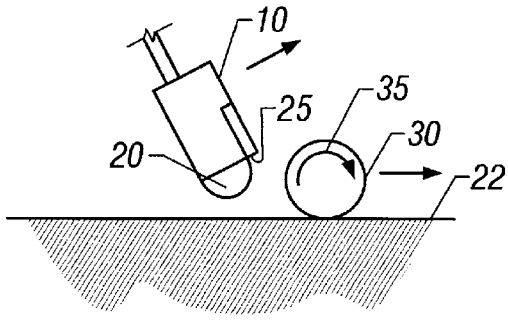

FIGS. 2A–2D show different positions of the putter 10 relative to a golf ball 30 during a putting stroke. Prior to the stroke (FIG. 2A) the putter 10 is set so that the runners 20 rest on the ground 22. The runners 20 elevate the blade 25 so that it is slightly below the ball's equator. The putter 10 is drawn back (FIG. 2B) and then pushed towards the ball. The bottom surfaces of the runners 20 are preferably above the ground 22 (FIG. 2C) as the ball is struck, if a good putting stroke is made. The blade 25 then impacts the ball 30 very near the ball's equator with an upward blow (FIG. 2D). This causes the ball to roll away from the putter with a desirable top spin (indicated by the arrow 35) and along a path collinear with a path defined by the putters swing.

Figure 3A:
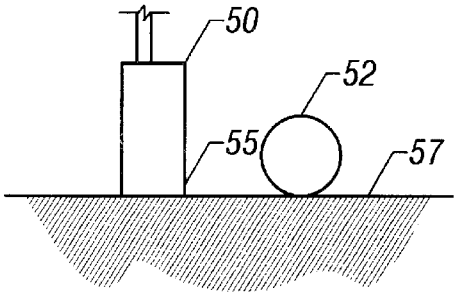
FIGS. 3A–3D are side views of a putter of the prior art, respectively, prior to being swung, during swinging, immediately prior to contact with a golf ball, and immediately after contact with the golf ball; and, FIGS. 4A–4D show another embodiment of the invention which includes rounded edges on the putter.
Figure 3B:
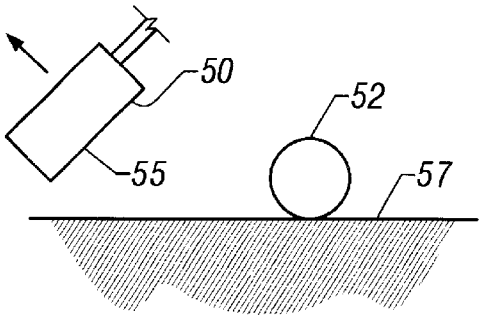
Figure 3C:
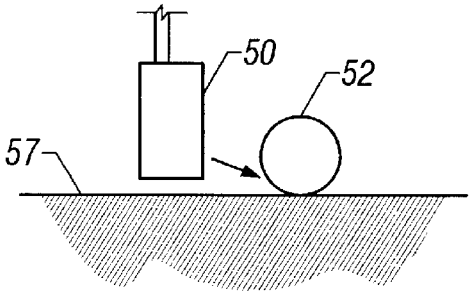
Figure 3D:
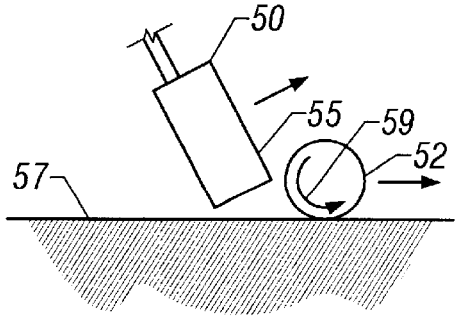
FIG. 3D (Prior Art)

FIGS. 3A–3D show an analogous sequence of steps for a putter 50 of the prior art. Prior to the stroke (FIG. 3A) the putter 50 preferably rests with its blade 55 even with or slightly above the ground 57. The blade 55 is typically just below the ball's equator. The putter 50 is then drawn back (FIG. 3B) and then pushed towards the ball (FIG. 3C). The blade impacts the ball with the leading edge below the equator of the ball with a downward force (FIG. 3D) to generate backspin on the ball (indicated in the figure by the arrow 59), causing the ball to skid. The ball may eventually exhibit a top-spin roll, although this typically occurs after the ball has skidded for some small distance and deviated from its intended course.

Other embodiments include additional features.

Figure 4B:
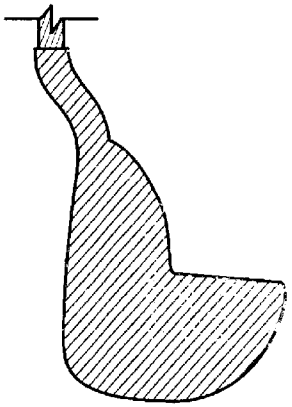
Figure 4A:
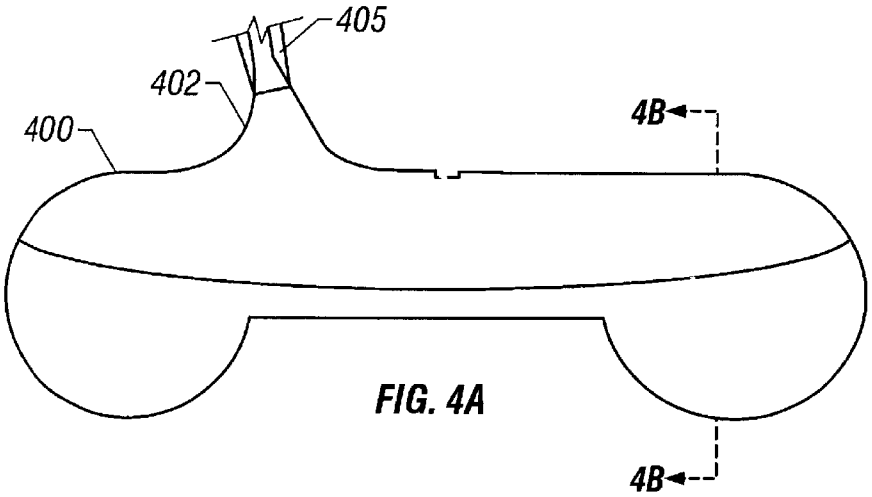
Figure 4C:
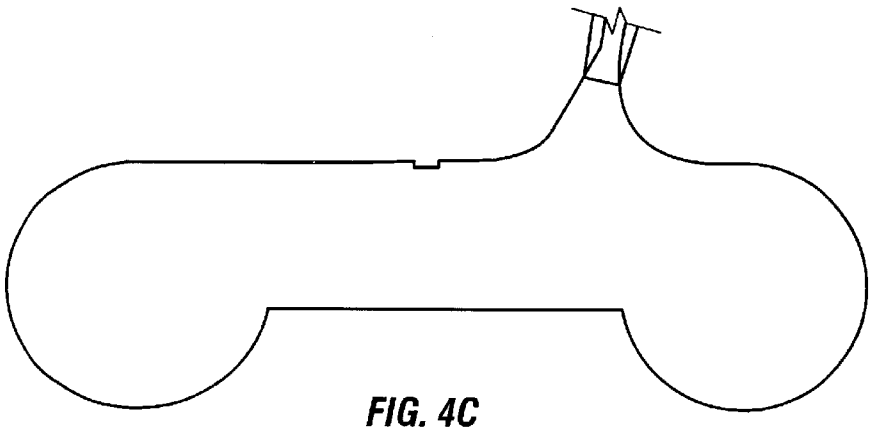

FIGS. 4A–4C show an embodiment that has a rounded head 400. The hozzle 402 of the head is sized to fit a shaft 405 around it. This embodiment includes a system which has no sharp edges on the putter—every edge is at least slightly rounded. The shaft fits around the outside of the hozel as shown.

The putter head 400 has a lower, runner area 410, which is wider in dimension than the upper, shaft attaching area 420. FIG. 4B shows a cross sectional view of the FIG. 4A rear view along the line 4B—4B. FIG. 4C shows the front view of the putter. The runners in this embodiment are rounded along multiple axes, to form a rounded ground engaging surface.

Figure 5C:
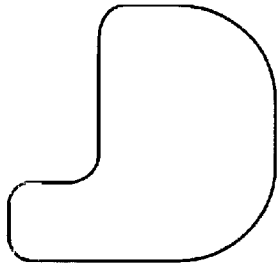
FIGS. 5A–5C show a rounded embodiment with a shaft that fits outside the putter neck.
Figure 5A:
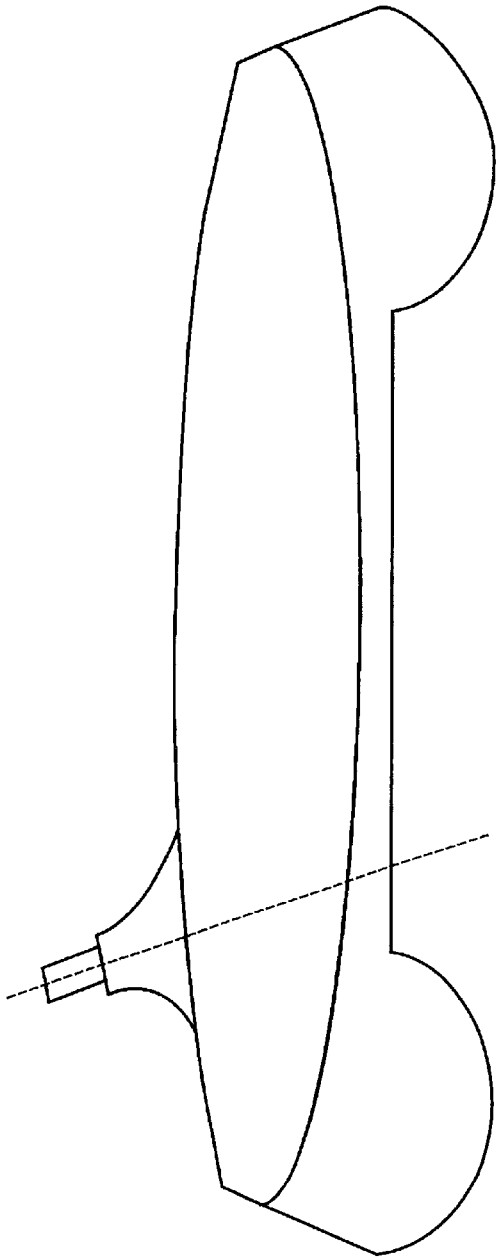
Figure 5B:
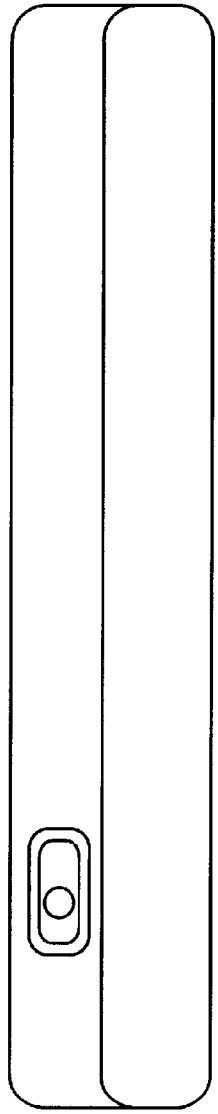

FIGS. 5A–5C show another rounded embodiment—this one having a shaft which fits around the outside of the neck of the putter. The preferred dimensions of this putter are 2.2 cm by 12.2cm overall with 1 cm lip forming the blade area.

Figure 6C:
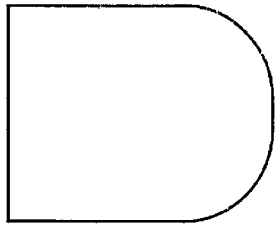
FIGS. 6A–6C show a crooked shaft putter embodiment.
Figure 6A:
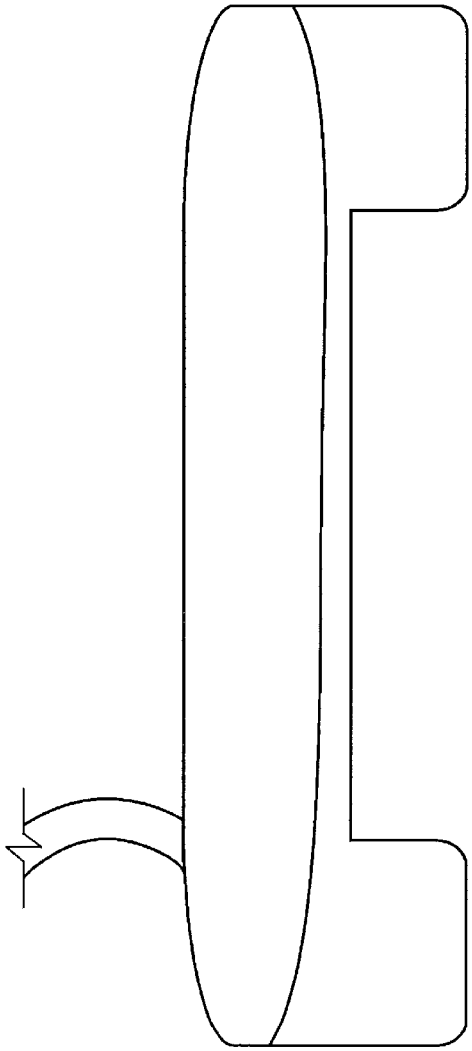
Figure 6B:
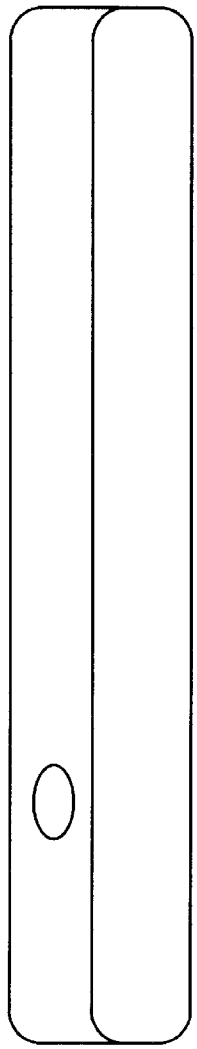

The FIGS. 6A–6C embodiment uses a crooked shaft.

Figure 7C:
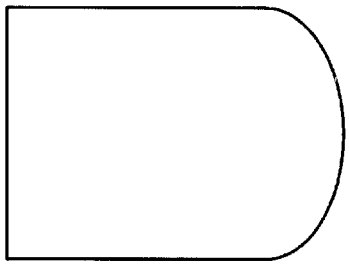
FIGS. 7A–7C show an embodiment including specially shaped runners.
Figure 7A:
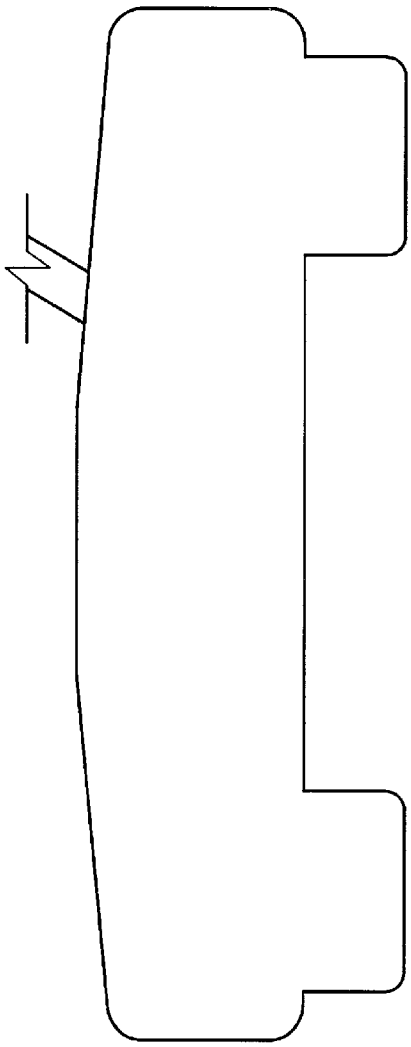
Figure 7B:
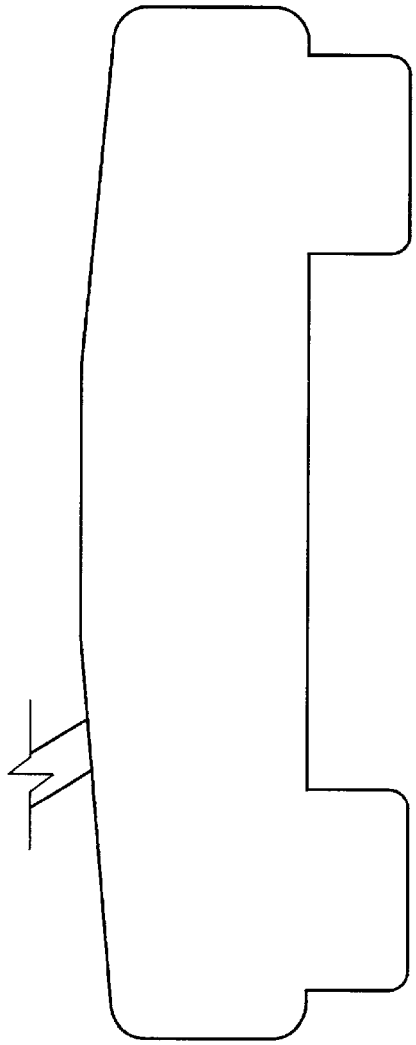

FIGS. 7A–7C shows an embodiment with runners that are less rounded than those of previous embodiments.

Figure 8:
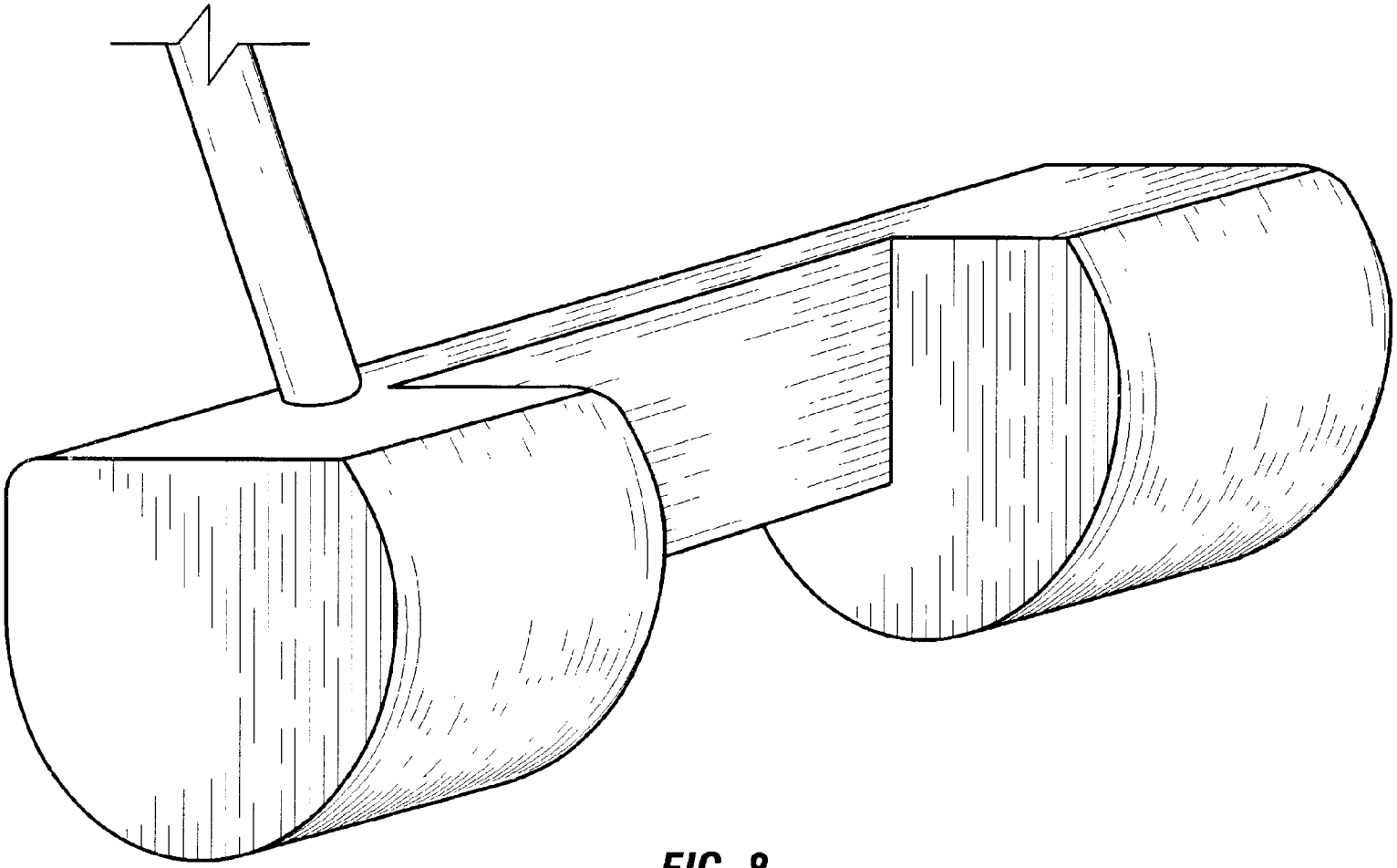
FIG. 8 shows an embodiment which is optimized for use with heavy material.

The FIG. 8 embodiment uses a special heavy material such as brass or bronze.

Other embodiments are within the scope of the invention. For example, runners can be included with any type of putter design. In addition, each dimension of the putter head depends on the types of materials used to fabricate the head. These dimensions can therefore be adjusted significantly for different types of putters formed from different materials. In particular, the dimensions are likely to decrease when more dense materials are used.

The runners described above have ellipsoidal cross sections. Alternatively, the runners have triangular, cylindrical, circular, or any other type of cross-sectional area. The runners preferably include both flat and curved, angled, or tapered portions in all dimensions. For instance, all surfaces of the runner can be curved (e.g., the runner has a hemispherical shape).

The preferred embodiment of the invention features two runners. In other embodiments the putter can have a single runner. In this case, the runner has a similar shape as described above. In still other embodiments, the putter includes more than two runners, distributed periodically or randomly along its bottom surface.

Preferably, the putter head and the runners are formed together in a single cast. Alternatively, the runners can be attached to the putter head using, e.g., a weld or adhesive. Runners can be made on a putter having any shape or size which falls within guidelines of the United States Golf Association (USGA).

The angle of the putter's shaft has minimal affect on the design of the putter head and the runners. The shaft can be imbedded directly into the putter head.

All such modifications are intended to be encompassed in the following claims.

What is claimed is:

1. A putter-type golf club adapted to strike a golf ball [at] *near* its equator,comprising:

a handle element;

a club head comprising:

a [top] *first* surface having an attachment element for the handle element, a ball-striking surface including a blade surface adapted to strike a golf ball, a rear surface disposed opposite said ball-striking surface, said [top] *first* surface extending between said ball striking surface and said rear surface, a first side surface extending between said ball-striking surface and said rear surface on a first side of the club head, a second side surface extending between said ball-striking surface and said rear surface on a second side of the club head, a bottom surface, formed opposite said [top] *first* surface, and bordered by said ball-striking surface, said rear surface and said first and second side surfaces, said bottom surface being non flat, and comprising a first runner extending from the bottom of said ball-striking surface adjacent said first side, having a height and having side surfaces and a bottom surface, said first runner occupying less than half of a surface area of said bottom surface, and having a height which is equal to or less than the equator of the golf ball, and a second runner extending from the bottom of said ball-striking surface adjacent said second side, having a height and having side surfaces and a bottom surface, said second runner occupying less than half of a surface area of said bottom surface, and having substantially the same height as the height of the first runner, said first and second runners collectively having a surface area which is less than a total area of said bottom surface of said club head, said first and second runners being spaced apart by a distance greater than a diameter of the golf ball, and [operating] *located* so that when said golf club is moved toward the golf ball with said runners slightly above the ground, said blade surface strikes the golf ball near its equator to impart an upward blow and a spin roll on the golf ball, wherein said first and second runners each comprise a front portion which faces the golf ball at address, a rear portion which faces away from the golf ball at address, and a surface extending between said front portion and said rear portion, said surface including a ground engaging surface which has a substantially curve area, a tangent portion of the curve abutting against the ground, and a straight segment disposed above said curved area.

2. The golf club of claim 1, wherein each said runner has one of an ellipsoidal, square, rectangular, circular, or triangular cross-sectional shape.

3. The golf club of claim 1, wherein said height of said runner is between ⅜ and ⅝ inch.

4. The golf club of claim 3, wherein said height of said runner is substantially 0.55 [inche] *inch*.

5. The golf club of claim 1, wherein said surface area of said runner is in the range of 0.15–0.35 square inches.

6. The golf club of claim 1, wherein said first and second runners have curved portions, and are integral with said golf club head.

7. The golf club of claim 1, wherein said runners are separated by a distance of substantially two inches.

8. The golf club of claim 1, wherein said runners are separated by a distance of between 1.5 and 2.5 inches.

9. The golf club of claim 1, wherein said runners form a part of said bottom surface of said club head.

10. The golf club of claim 1, wherein said runners are physically separate pieces from the golf head, and further comprising an attachment substance attaching said runners to said bottom surface of said club head.

11. The golf club of claim 10, wherein said club head and said runners are formed of different materials.

12. The golf club of claim 1, further comprising an insert attached to said blade so that said insert strikes the golf ball when said golf club is swung at the golf ball, said insert formed of a different material than said golf club head.

[13. A putter-type golf club adapted to strike a gold ball at its equator comprising:

a handle element;

a club head comprising:

a top surface having an attachment element for the handle element, a ball-striking surface including blade surface adapted to strike the golf ball, a rear surface disposed opposite said ball-striking surface, said top surface extending between said ball striking surface and said rear surface, a first side surface extending between said ball-striking surface and said rear surface on a first side of the club head, a second side surface extending between said ball-striking surface and said rear surface on a second side of the club head, a bottom surface, formed opposite said top surface, and bordered by said ball-striking surface, said rear surface and said first and second side surfaces, said bottom surface being non flat, and comprising a first runner extending from the bottom of said ball-striking surface adjacent said first side, having a height and having side surfaces and a bottom surface, said runner having a front portion which faces the golf ball, a rear portion which faces away from the golf ball, and said bottom surface extending between said front portion and said rear portion, said bottom surface including a ground engaging surface which has a shaped area which is shaped such that only a part of an area defined by a perimeter of said front portion, rear portion and side portions will touch the ground when said club is pressed against the ground, said first runner occupying less than half of a surface area of said bottom surface, and having a height which is equal to or less than an equator of the golf ball, and a second runner extending from the bottom of said ball-striking surface adjacent said second side, having a height and having side surfaces and a bottom surface, and said bottom surface extending between said front portion and said rear portion, said bottom surface including a ground engaging surface which has a shaped area which is shaped such that only a part of an area defined by a perimeter of said front portion, rear portion and side portions will touch the ground when said club is pressed against the ground, said second runner occupying less than half of a surface area of said bottom surface, and having substantially the same height as the height of the first runner, said first and second runners collectively having a surface area which is less than a total area of said bottom surface of said club head, said first and second runners being spaced apart by a distance greater than a diameter of the golf ball, and operating so that when said golf club is moved toward the golf ball with said runners slightly above the ground, said blade surfaces strikes the golf ball near the equator of the golf ball to impart an upward blow and a spin roll on the golf ball, wherein said first and second runners each comprise a front portion which faces the golf ball at address, a rear portion which faces away from the golf ball at address, and a surface extending between said front portion and said rear portion, said surface including a ground engaging surface which has a substantially curved area, a tangent portion of the curve abutting against the ground, and a straight segment disposed above said curved area.]

[14. A putter as in claim 13, wherein said shaped area is a section of a circle.]

[15. A putter as in claim 13, wherein said shaped area is a curved area.]

[16. The putter of claim 13, wherein said surface area of said runner in the range of 0.15–0.35 square inch.]

* * * * *